(12) United States Patent
Parthasarathy

(10) Patent No.: US 9,218,108 B1
(45) Date of Patent: Dec. 22, 2015

(54) BATTERY CHARGING METRICS AND REPRESENTATIONS

(71) Applicant: Amazon Technologies, Inc., Reno, NV (US)

(72) Inventor: Rangaprabhu Parthasarathy, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 195 days.

(21) Appl. No.: 13/743,867

(22) Filed: Jan. 17, 2013

(51) Int. Cl.
  *G06F 3/048* (2013.01)
  *G06F 3/0484* (2013.01)
  *G06F 1/32* (2006.01)

(52) U.S. Cl.
  CPC ............ *G06F 3/0484* (2013.01); *G06F 1/3212* (2013.01); *G06F 3/048* (2013.01)

(58) Field of Classification Search
  CPC ........ G06Q 10/04; G06F 3/048; G06F 1/3212
  USPC ....................................................... 715/771
  See application file for complete search history.

(56) References Cited

U.S. PATENT DOCUMENTS

| 5,329,219 | A  | * | 7/1994 | Garrett ........................... 320/150 |
| 6,456,036 | B1 | * | 9/2002 | Thandiwe ...................... 320/106 |
| 2004/0088388 | A1 | * | 5/2004 | Satoh et al. ................... 709/220 |
| 2004/0190047 | A1 | * | 9/2004 | Ito et al. ....................... 358/1.15 |
| 2011/0184574 | A1 | * | 7/2011 | Le Roux et al. ............... 700/291 |
| 2012/0098500 | A1 | * | 4/2012 | Vestama et al. ............... 320/149 |
| 2013/0226441 | A1 | * | 8/2013 | Horita ........................... 701/118 |
| 2014/0070606 | A1 | * | 3/2014 | Gibeau .......................... 307/9.1 |

* cited by examiner

*Primary Examiner* — Jennifer To
*Assistant Examiner* — Ashley Fortino
(74) *Attorney, Agent, or Firm* — Sutherland Asbill & Brennan LLP

(57) ABSTRACT

This disclosure describes systems and methods related to determining and providing battery charging metrics for an electronic device. In one embodiment, one or more processors may determine the capacity of the battery of an electronic device and a first battery charge level. A charging rate associated with the battery charger may be determined. A battery charging time may be calculated based at least in part on the battery capacity, the charging rate, the first battery charging time, and a second battery charging time. A representation of a charging status associated with the battery may be generated.

19 Claims, 4 Drawing Sheets

BATTERY CHARGING METRICS AND REPRESENTATIONS

BACKGROUND

People often have multiple mobile and wireless devices, such as smartphones and laptops that they utilize daily. The mobile and wireless devices may consume power at different rates, depending on the type of applications executing and the hardware of the device. For example, some devices consume more power than other devices due to large displays, complex radios, and electronics. People often charge mobile and wireless devices at home, at work, or in the car to maintain various levels of power for the devices.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
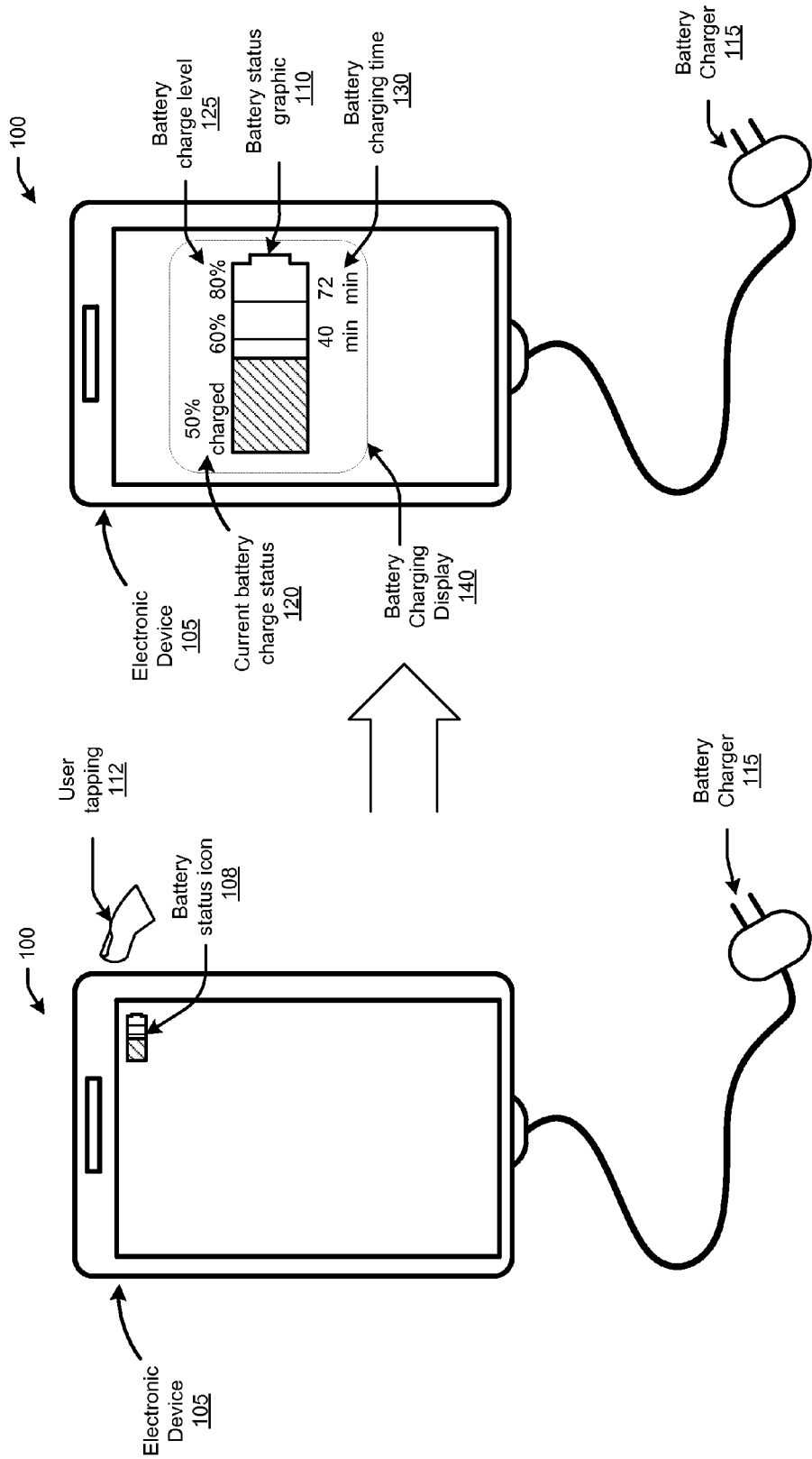
FIGS. 1A-1B illustrate systems for presenting metrics associated with a battery of an electronic device in accordance with an embodiment of the disclosure.

Many mobile and wireless electronic devices have some form of a battery icon. When the device is plugged in for charging the battery, this icon may indicate the charging progress, typically by displaying a special icon for the charging process underway and the current battery level. This disclosure describes systems and methods related to determining battery charging metrics associated with an electronic device, such as a smartphone or tablet, and presenting the metrics to a user. The battery charging metrics may be provided to a user to enhance the user's experience. The battery charging metrics may be provided through a graphical and/or textual representation to depict different kinds of data associated with charging the electronic device. For instance, the representation may depict an amount of charge associated with the battery, the time to charge the electronic device to a particular threshold of the capacity of the battery (e.g., 25%, 50%, etc.) based at least in part on the capacity of the battery, and/or the charger used.

The representation may also depict the times needed to charge to one or more battery charge levels between the current battery charge level and 100% battery capacity. The battery charge levels may be designated at the time of manufacture or may be specified by a user. The representation may be presented to the user when the user connects the electronic device to a charger, or if the user clicks on or selects a battery icon on the electronic device while it is being charged. In some embodiments, one or more notifications may be generated once a certain level of charge has been reached. The notification may be visual, audible, or tactile.

In some embodiments, several electronic devices may be associated with each other and battery charging metrics for each device may be shared by the electronic devices. For example, if Anna has a tablet charging in her kitchen, a smartphone charging in her bedroom, and a laptop charging in her study, Anna may be able to check the charging status of her tablet and smartphone from the laptop and see battery charging metrics, such as how long it will take for her devices to be charged to 50%. In some embodiments, Anna may be able to specify specific battery charge levels for each device from another device, or specify particular notifications (e.g., audible alarms or text messages) when a device reaches a specified battery charge level.

A battery charging display depicting battery charging metrics may be generated using information accessed or obtained by the electronic device. The systems and methods described herein may present a user with estimates for charging the electronic device to certain battery charge levels. In some embodiments, the battery charging display may also make recommendations for different battery chargers that may charge the electronic device faster or more efficiently. The recommendations may include a hyperlink to a purchase option for the recommended charger.

Illustrative System

FIGS. 1A-1B schematically depict an illustrative use case that involves selecting a battery status icon 108 to initiate a representation of a charging status of a battery associated with the electronic device 105, such as the battery charging display 140. FIG. 1A illustrates a system 100 for charging an electronic device 105. In brief overview, the electronic device 105, such as an electronic reader, may comprise one or more processors and a display, such as a liquid crystal display (LCD). The electronic device 105 may be charged using a battery charger 115, such as a wall charger or a universal serial bus (USB) charger. While the electronic device 105 is connected to a power source through a battery charger 115, a battery status icon 108 may be displayed. The battery status icon 108 may indicate a current battery charge status and that the charging process is underway. In some embodiments, the battery status icon 108 may indicate the current battery charge status by displaying a percentage of the battery of the electronic device 105 that is charged. In some embodiments, the battery status icon 108 may indicate that the charging process is underway by displaying an electricity bolt, animating the battery status icon 108 to progressively fill the icon and refill the icon, or similarly depict the charging process. In some embodiments, an electronic device 105 may depict the status of the charging process by using different colors to indicate different stages of charging (e.g., red may indicate an electronic device 105 is charging while green may indicate an electronic device 105 has been fully charged). FIG. 1A further depicts a user selecting (e.g., tapping 112, clicking, etc.) the battery status icon 108, which would initiate the battery charging display, depicted in FIG. 1B.

In one embodiment, as depicted in FIGS. 1A-1B, as the electronic device 105 is connected to a battery charger 115, a battery status icon 108 may be displayed. The battery status icon 108 may be displayed in a corner of the display of the electronic device 105. A user may select the battery status icon 108 (as depicted in FIG. 1A) by actuating a button or selection on the electronic device 105 (e.g., tapping 112 the battery status icon 108 or using a power/wake button of the electronic device 105) to initiate the process for determining a battery charging status and presenting the battery charging metrics to the user (e.g., via the battery charging display 140). Responsive to receiving the input from the user (e.g., tapping 112 the battery status icon 108), the electronic device 105 may generate and display a representation of a charging status. In some embodiments, the representation of the charging status may be in the form of graphical and/or textual content (e.g., battery charging display 140) associated with charging the battery of the electronic device 105.

In another embodiment, the battery charging display 140 may be presented to the user when the electronic device 105 is connected to a battery charger 115 and is charging. For example, in some electronic devices 105, other functionality may be disabled while the electronic device 105 is charging. In some embodiments, the battery charging display 140 may be presented to the user while the electronic device 105 is charging, and the electronic device 105 is in a sleep or idle mode.

In another embodiment, the battery charging display 140 may be a stand-alone application that must be invoked to obtain, process, generate, and/or present the battery charging metrics associated with charging the battery of the electronic device 105. In some embodiments, the stand-alone application may execute in the background of the electronic device 105. In some embodiments, the application may need to be specifically invoked by the user, but once executing, a battery charging display 140 may be depicted on the display of the electronic device 105.

FIG. 1B illustrates a system 100 for a battery charging display 140 associated with an electronic device 105. In one embodiment, responsive to the user interaction (e.g., tapping 112) with the battery status icon 108, a battery charging display 140 may be initiated. In some embodiments, the user may otherwise actuate an icon, a hyperlink, or the like to initiate a battery charging display 140. The battery charging display 140 may present the user with a graphical and/or a textual representation of the battery charging metrics associated with charging the battery of the electronic device 105. The battery charging display 140 may include a battery status graphic 110 that may depict the current battery charge status 120 of the electronic device 105, one or more battery charge levels 125, and one or more corresponding battery charging times 130 corresponding to the one or more battery charge levels 125. The electronic device 105 may process information associated with the battery of the electronic device 105 and the battery charger 115 to generate information associated with battery charging times 130 (e.g., estimated duration of time to charge to a battery charge level 125). For example, a battery charging time 130 for a battery charge level 125 may first identify the current level of charge of the battery and a second battery charge level to which the electronic device 105 is to be charged. The battery charging time 130 may be calculated using the known capacity for the battery and a current flow of power from a battery charger 115. In some embodiments, the battery charging time 130 may also be based at least in part on the age of the battery or the condition of the battery to account for wear and degradation of the battery. In some embodiments, the battery charger 115 may be internal to the electronic device 105 or may be external (e.g., part of a power cord and/or charging brick).

Figure 2:
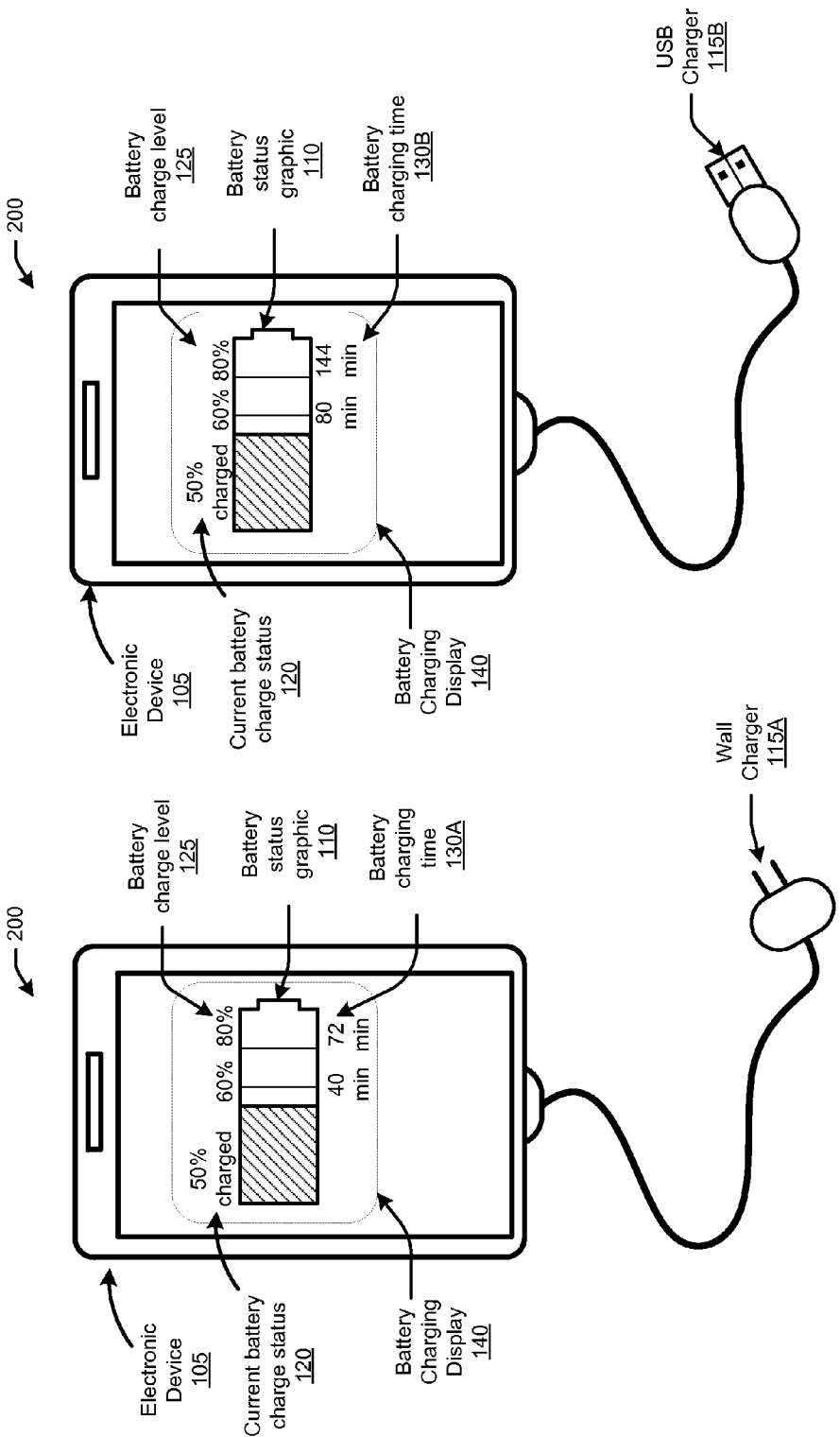
FIGS. 2A-2B illustrate example embodiments of presenting metrics associated with a battery of an electronic device in accordance with an embodiment of the disclosure.

FIGS. 2A-2B illustrate diagrams 200 of example embodiments of battery charging displays 140 associated with an electronic device 105 in accordance with an embodiment of the disclosure. FIG. 2A depicts an electronic device 105 connected to a battery charger 115 (e.g., wall charger 115A). The battery charging display 140 depicts a battery status graphic 110, a current battery charge status 120, and a battery charge level 125. Also depicted is a battery charging time 130A corresponding to the battery charge level 125. The battery charging time 130A may be calculated or determined based at least in part on the battery capacity, the current battery charge status 120, the battery charge level 125, and data associated with the wall charger 115A (e.g., battery current rating or wattage rating). FIG. 2B depicts the same electronic device 105 connected to a different battery charger (e.g., a USB charger 115B). As shown, the battery status graphic 110 and accompanying textual information differ based at least in part on the different battery chargers (e.g., 115A, 115B). FIG. 2B displays the same current battery charge status 120, battery status graphic 110, and battery charge level 125. However, the battery charging time 130B corresponding to the battery charge level 125 has changed based upon the different battery chargers 115A, 115B. As depicted in the diagram, the battery charging time 130A associated with the wall charger 115A in FIG. 2A is less than the battery charging time 130B associated with the USB charger 115B in FIG. 2B. Thus, given the information, the user may select to charge the electronic device 105 using the wall charger 115A because the estimated battery charging time 130A for reaching a battery charge level 125 of 80% is indicated at 72 minutes, whereas the estimated battery charging time 130B for reaching a battery charge level 125 of 80% using a USB charger 115B is indicated at 144 minutes. In some embodiments, factors other than a charging rate associated with the battery charger 115 may affect the battery charging times 130. The factors may include, but are not limited to, current use of the electronic device 105, temperature, various user settings, Wi-Fi or cellular data usage, age of the battery or electronic device, and the like.

Figure 3:
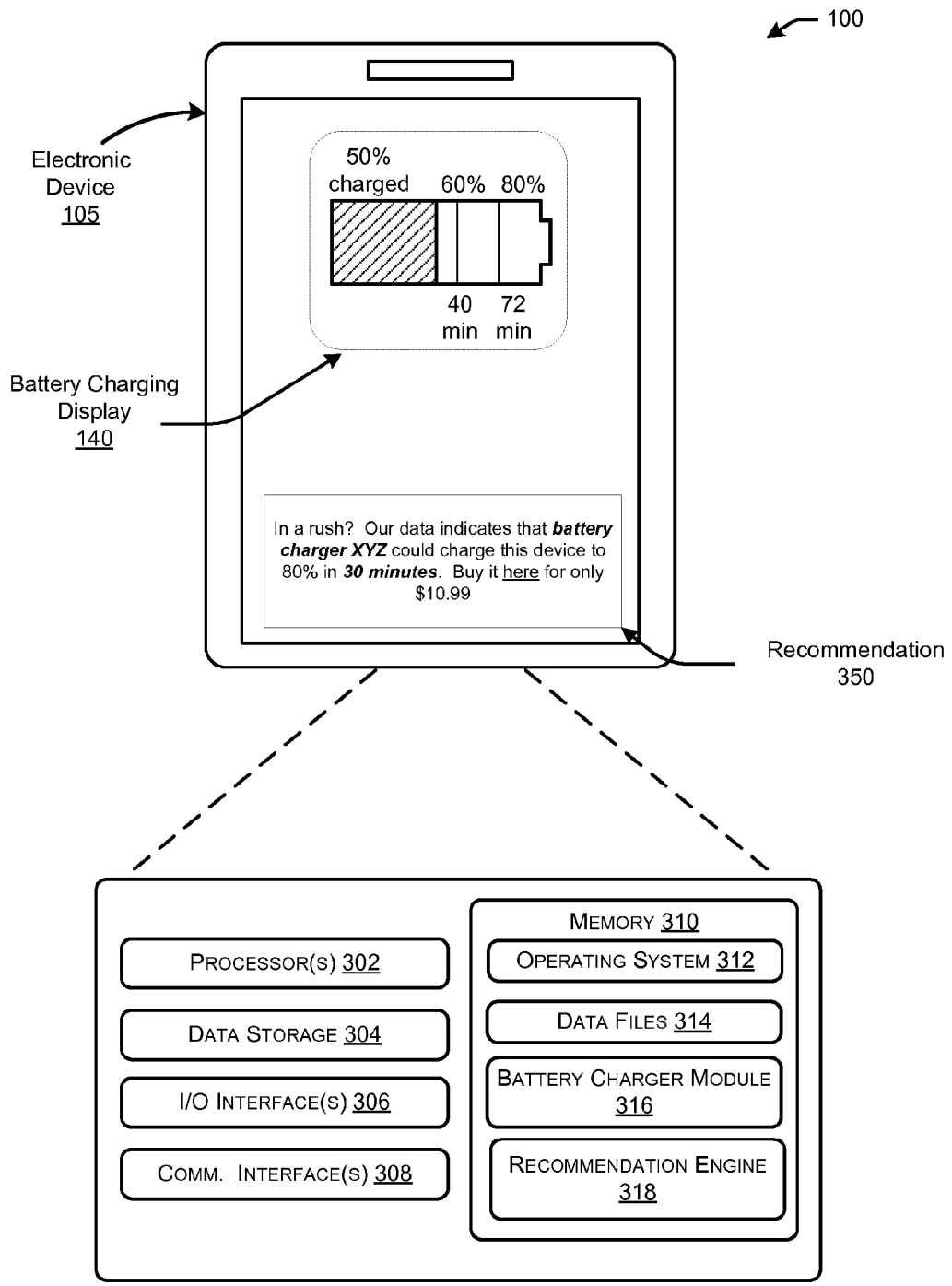
FIG. 3 illustrates a block diagram of components of an electronic device associated with determining and presenting battery charging metrics in accordance with an embodiment of the disclosure.

FIG. 3 is a block diagram that illustrates components of the electronic device 105 and a presentation 300 of the battery charging display 140 and a recommendation 350 for a different charger based at least in part on the generated battery charging metrics. The electronic device 105 may comprise one or more processors 302, one or more memories 310, one or more input/output (I/O) interfaces 306, and one or more communication interfaces 308. The one or more processors 302 may individually comprise one or more cores and may be configured to access and execute, at least in part, instructions stored in the one or more memories 310. The one or more memories 310 comprise one or more computer-readable storage media (CRSM). The one or more memories 310 may include, but are not limited to, random access memory (RAM), flash RAM, magnetic media, optical media, and so forth. The one or more memories 310 may be volatile in that information is retained while providing power or non-volatile in that information is retained without providing power.

The electronic device 105 may further include additional data storage 304 such as removable storage and/or non-removable storage including, but not limited to, magnetic storage, optical disk storage, and/or tape storage. Data storage 304 may provide non-volatile storage of computer-executable instructions and other data. The memory 310 and/or the data storage 304, removable and/or non-removable, are examples of computer-readable storage media (CRSM).

The one or more I/O interfaces 306 may also be provided in the electronic device 105. These I/O interfaces 306 allow for coupling devices, such as keyboards, joysticks, touch sensors, cameras, microphones, speakers, haptic output devices, memory, and so forth, to the electronic device 105.

The one or more communication interfaces 308 provide for the transfer of data between the electronic device 105 and another device directly, via a network, or both. The communication interfaces 308 may include, but are not limited to, personal area networks (PANs), wired local area networks (LANs), wireless local area networks (WLANs), wireless wide area networks (WWANs), and so forth. The communication interfaces 308 may utilize acoustic, radio frequency, optical, or other signals to exchange data between the electronic device 105 and another device such as an access point, a host computer, a router, an e-reader device, another electronic device 105, and the like.

The one or more memories 310 may store instructions for execution by the processor 302 to perform certain actions or functions. These instructions may include an operating system 312 configured to manage hardware resources, such as the I/O interfaces 306, and provide various services to applications executing on the processor 302. The one or more memories 310 may also store data files 314 containing information about the operating system 312.

A battery charger module 316 may be stored in the one or more memories 310. The battery charger module 316 may receive or access information associated with a battery of the electronic device 105. In some embodiments, the battery charger module 316 may access or receive information (e.g., the charging rate) associated with a battery charger 115 for the electronic device 105. The battery charger module 316 may accept information from the user to set one or more battery charge levels 125. In some embodiments, one or more battery charge levels 125 may be determined or set by a user. In some embodiments, one or more battery charge levels 125 may be pre-set at the time of manufacture. In some embodiments, the battery charge levels 125 may be set by a user, at the time of manufacture, or any combination thereof. The battery charger module 316 may use the information received or accessed associated with the battery of the electronic device 105 and/or the battery charger 115 associated with the electronic device 105 to determine the battery charging times 130 (e.g., the time it will take to charge the electronic device 105 to the pre-determined battery charge levels 125). In some embodiments, the battery charger module 316 may determine a battery charging time 130 for a battery charge level 125 based at least in part on additional factors, such as updated charge rate as the battery of the electronic device 105 degrades over time, temperature of the electronic device 105, data usage by one or more applications executing on the electronic device 105 and the like.

In some embodiments, the battery charger module 316 may generate one or more notifications when a battery charge level 125 has been reached. In some embodiments, the battery charger module 316 may generate one or more recommendations for faster charge, such as turning off Wi-Fi or quitting one or more applications.

The recommendation engine 318 may be stored in the one or more memories 310. The recommendation engine 318 may receive information collected or generated by the battery charger module 316. For example, the recommendation engine 318 may receive one or more battery charging times 130 for a given battery charger 115. Based at least in part on the information received from the battery charger module 316, the recommendation engine 318 may identify or generate one or more recommendations 350 for other battery chargers. For example, the recommendation engine 318 may generate one or more recommendations 350 for other battery chargers which may provide more efficient or faster charging of the electronic device 105 than the current battery charger 115. Recommendations 350 may also be based on other factors, such as the size of the battery charger 115 (e.g., the size of the charging brick or the length of the power cord) or the type of charger based upon geographic location. For example, the recommendation engine 318 may generate or identify chargers with different adapters if the recommendation engine 318 determines the electronic device 105 is currently located in a country different that its associated country of residence (e.g., if the electronic device is primarily used in the U.S. but the recommendation engine determines the device is currently in Asia, the recommendation engine 318 may identify one or more chargers compatible with power sources prevalent in Asia). In some embodiments, the recommendation engine 318 may query a data storage 304 or a remote database or repository to identify particular chargers based upon the data received from the battery charger module 316. For example, the recommendation engine 318 may query a local database stored in data storage 304 to identify particular chargers, data associated with the chargers, and vendors to purchase the identified chargers.

In some embodiments, the recommendation engine 318 may identify a recommendation 350 for a different battery charger 115 based at least in part on at least one of the battery capacity, the current battery charger 115, or the battery charging time 130 calculated or determined by the battery charger module 316. The recommendation 350 for the battery charger may include a hyperlink to a retail website or a direct purchase option for the battery charger 115 from a vendor. In some embodiments, the recommendation engine 318 may generate a notification which may include the recommendation for a battery charger. The notification may comprise one or more of the hyperlinks, a short description of the offered battery charger 115, a current price for the battery charger 115, and the like. The notification may be an email, a text message, a pop-up message, and/or a log screen advertisement of the electronic device 105.

In some embodiments, the recommendation engine 318 may communicate the information associated with a recommended battery charger and transmit the information to the battery charger module 316. The battery charger module 316 may generate, calculate, or otherwise determine a battery charging time 130 based at least in part on the information associated with the recommended battery charger 115 and may transmit the information to the recommendation engine 318. The recommendation engine 318 may then use the information in the notification for the recommended charger, thereby providing the user with information about the differences in performance of the two battery chargers 115.

Within the one or more memories 310, one or more modules may be stored. As used herein, the term module designates a functional collection of instructions that may be executed by the one or more processors 302. For convenience in description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

FIG. 3 also depicts an example embodiment of a recommendation 350 generated by the recommendation engine 318. The recommendation 350 identifies a different charger (e.g., battery charger XYZ) and may include an estimated battery charging time based at least in part on the recommended charger, given the same conditions for the current battery charger 115. The recommendation 350 may also provide a hyperlink to a vendor to purchase the recommended charger and a price associated with the recommended charger.

Figure 4:
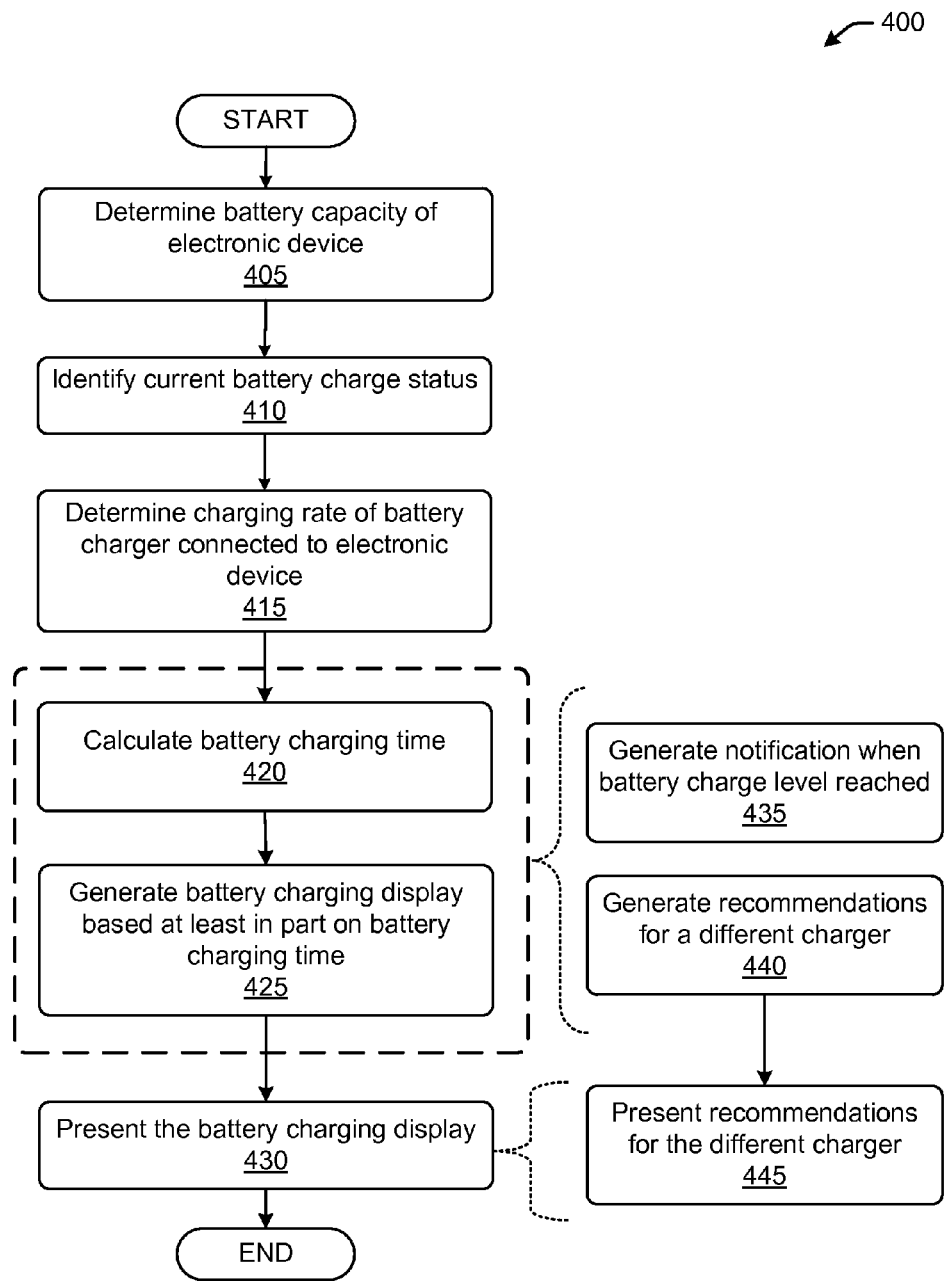
FIG. 4 illustrates a flow diagram of a process for determining and presenting battery charging metrics in accordance with an embodiment of the disclosure.

FIG. 4 illustrates a flow diagram of a process for determining and presenting battery charging metrics in accordance with an embodiment of the disclosure. In brief overview, at block 405, battery charger module 316 may determine the battery capacity of the electronic device 105. At block 410, the current battery charge status 120 may be identified by the battery charger module 316. At block 415, the charging rate of the battery charger 115 connected to the electronic device 105 may be determined by the battery charger module 316. At block 420, a battery charging time 130 (e.g., duration of time to charge the electronic device 105 to a battery charge level 125) may be calculated by the battery charger module 316. At block 425, a battery charging display 140 may be generated by a battery charger module 316. At block 430, the battery charging display 140 may be displayed to a user. In some embodiments, at block 435, the battery charger module 316 may generate one or more notifications when a battery charge level 125 has been reached. In some embodiments, at block 440, the recommendation engine 318 may generate one or more recommendations for a different battery charger 115. At block 445, recommendations for the different battery charger 115 may be presented.

At block 405, battery charger module 316 may determine the battery capacity of the electronic device 105. In some embodiments, the battery charger module 316 may retrieve or access information associated with the battery to obtain the battery capacity of the electronic device 105. In some embodiments, the user may specify the battery capacity of the electronic device 105. The battery charger module 316 may request the information from the operating system 312. In some embodiments, the battery charger module 316 may request the information from a remote server over one or more networks.

At block 410, the current battery charge status 120 may be identified. In some embodiments, the battery charger module 316 may retrieve or access information associated with the battery and current flow, current device usage, or the like to obtain or determine the current battery charge status 120 of the electronic device 105 (e.g., current percentage of the charge held by the battery of the electronic device 105). The battery charger module 316 may request the information from the operating system 312.

At block 415, the charging rate of the battery charger 115 connected to the electronic device 105 may be determined. The charging rate (also referred to as "charge rate") may be the amperage output of a battery charger. In some embodiments, the battery charger module 316 may retrieve information from the battery charger 115. In some embodiments, the battery charger module 316 may determine the amount of power supplied by the battery charger 115 based at least in part on the type of battery charger. For example, in some embodiments, the battery charger module 316 may identify a battery charger as a USB charger 115B or a wall charger 115A. In some embodiments, the battery charger 115 may have an associated current rating or a wattage rating. The current rating or wattage rating may be used to determine the charging rate of the battery charger 115 connected to the electronic device 105.

At block 420, a battery charging time 130 (e.g., the duration of time to charge the electronic device 105 to a battery charge level 125) may be calculated by the battery charger module 316. In some embodiments, the battery charging time 130 may be calculated based at least in part on the battery capacity of the electronic device 105 and the charging rate of the battery charger 115. In some embodiments, a user may specify one or more battery charge levels 125. For example, a user may be prompted by the battery charger module 316 to enter one or more battery charge levels 125 as percentages. In some embodiments, the battery charge levels 125 may be set at the time of manufacture.

At block 425, a battery charging display 140 may be generated. A battery charging display 140 may be a graphical and/or textual representation of battery charging metrics associated with the electronic device 105. In some embodiments, a battery status graphic 110 may be generated to depict a current battery charge status 120. In some embodiments, the battery status graphic 110 may be augmented with additional information, such as the battery charge levels 125 and the battery charging times 130. In some embodiments, the battery charging display 140 may be generated based at least in part on the battery capacity, the current battery charge status 120, the battery charge level 125, and the battery charging time 130. In some embodiments, the different battery charge levels 125 may be depicted by different colors, shading, different font styles (e.g., bold or italic), or other visual techniques. In some embodiments, the battery charging display 140 may be generated in response to receiving an input from a user. For example, the battery charging display 140 may be generated in response to the user tapping 112 or otherwise selecting or actuating a battery status icon 108 on the display of the electronic device 105, as depicted in FIG. 1A.

In some embodiments, the battery charger module 316 may retrieve information associated with one or more applications associated with the electronic device 105. The information may indicate the power consumption associated with the one or more applications. For example, if the user frequently uses an email client of the electronic device 105 to check email or a video streaming client to watch videos, the battery charger module 316 may track and maintain historic power consumption data associated with the applications. The battery charger module 316 may present the retrieved information in association with the battery charging display 140 to the user. The information may be presented in a notification such as, but not limited to, emails, text messages, pop-up messages, notification pages, or the like. By presenting the information to the user, the user may determine which battery charge level 125 to charge the electronic device 105 to in view of the user's needs. For example, if the user knows that he or she will need to watch a video, the user may be able to determine that he or she needs to charge the electronic device 105 an additional 10% based upon the history of the video streaming client.

At block 430, the battery charging display 140 may be displayed to a user. In some embodiments, the battery charging display 140 may be displayed on a liquid crystal display (LCD) associated with the electronic device 105. The battery charging display 140 may include the current battery charge status 120, one or more battery charge levels 125, one or more battery charging times 130, and/or a battery status graphic 110 which may pictorially depict battery charging metrics associated with the battery of the electronic device 105. In some embodiments, the battery charging display 140 may be presented to the user in response to detecting a battery charger 115 connected to the electronic device 105. For example, the electronic device 105 may be an electronic reader that displays the battery charging display 140 when connected to a battery charger 115. In some embodiments, the battery charging display 140 may be presented to the user in response to receiving an input from the user. For example, the battery charging display 140 may not be shown until the user taps 112 on or otherwise selects the battery status icon 108.

In some embodiments, at block 435, the battery charger module 316 may generate one or more notifications when a battery charge level 125 has been reached. In some embodiments, at block 435, the battery charger module 316 may generate one or more notifications when a battery charge level 125 has been reached and in response to the battery charging time 130 being calculated at block 420. In some embodiments, at block 435, the battery charger module 316 may generate one or more notifications when a battery charge level 125 has been reached and in response to the generation of the battery charging display 140 at block 425. A notification may be one or more of a text message, an email message, a pop-up message, an audible alarm, or a vibration alarm. In some embodiments, the user may specify a phone number or email address to be used for the notifications. In some embodiments, the battery charging display 140 may permit an electronic device 105 to track the current states and charging processes of other devices. For example, George P. Burdell may have a tablet, a smartphone, and a laptop, all charging in various rooms in his home. George may have designated his laptop as the main device and has associated his tablet and smartphone with the battery charging system. George may receive one or more notifications associated with the charging statuses of the tablet and smartphone on his laptop. For instance, George may receive a pop-up message when his smartphone is charged to 50%. Additionally, the smartphone may generate an audible alarm to indicate that it has been charged to the 50% battery charge level 125.

In some embodiments, at block 440, the recommendation engine 318 may generate one or more recommendations for a different battery charger 115. In some embodiments, at block 440, the recommendation engine 318 may generate one or more recommendations for a different battery charger 115 in response to the battery charging time 130 being calculated at block 420. In some embodiments, at block 440, the recommendation engine 318 may generate one or more recommendations for a different battery charger 115 in response to the generation of the battery charging display 140 at block 425. The recommendation engine 318 may retrieve information associated with different chargers from one or more data sources, such as websites, data repositories, databases, and the like. The recommendation engine 318 may identify or generate recommendations based on several different factors, which may include but are not limited to the charging rates associated with the chargers, the type of the charger (e.g., USB, wall charger, etc.), the size of the charger (e.g., compact chargers for travel or chargers with long cords), and the like.

In some embodiments, at block 445, the recommendations for the different charger 115 generated at block 440 may be presented to the user. In some embodiments, at block 445, the recommendations for the different charger 115 generated at block 440 may be presented to the user in conjunction or in association with the presentation of the battery charging display 140 at block 430. In some embodiments, the recommendations 350 may be presented in the same manner as the battery charging display 140. In some embodiments, the recommendations 350 may be presented to the user even if the battery charging display 140 is not currently displayed (e.g., the battery charging display has not been invoked as described in FIGS. 1A-1B). The recommendations 350 may be presented to the user via email message, text message, pop-up message, notification screen, or as a message in the user account.

Similarly, in some embodiments, recommendations for faster charge (e.g., turning off Wi-Fi capabilities or terminating one or more applications) may be presented to the user in association with the battery charging display 140. In some embodiments, the recommendations for faster charge may be presented to the user via email message, text message, pop-up message, notification screen, or as a message in the user account.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   determining a capacity associated with a battery of an electronic device;
   determining a first battery charge level based at least in part on the capacity associated with the battery and at least an estimate of a present amount of charge associated with the battery;
   determining a first charging rate associated with a first battery charger connected to the electronic device;
   calculating a battery charging time based at least in part on the battery capacity, the first charging rate, and the first battery charge level, wherein the battery charging time is an estimation of a duration of time to charge the battery from the first battery charge level to a second battery charge level, wherein the second battery charge level is at a level between the first battery charge level and the capacity associated with the battery, wherein the second battery charge level is determined using input received from a user of the electronic device;
   receiving input requesting a representation of a charging status associated with the battery;
   generating the representation of the charging status, the representation indicative at least of the battery charging time;
   displaying the representation of the charging status;
   generating a recommendation for a second battery charger based at least in part on the battery charging time, wherein the second battery charger is associated with a second charging rate that is faster than the first charging rate; and
   presenting the recommendation to a user of the electronic device.

2. The computer-readable medium of claim 1, further comprising:
   generating a notification in response to the battery reaching the second battery charge level, wherein the notification is one of:
   i) a text message,
   ii) an email message,
   iii) a pop-up message,
   iv) an audible alarm, or
   v) or a vibration alarm.

3. The computer-readable medium of claim 1, further comprising:
   generating a notification comprising one or more recommendations for increasing the first charging rate of the battery, wherein the one or more recommendations comprise instructions to a user to at least one of turn off Wi-Fi capabilities associated with the electronic device, terminate one or more applications executing on the electronic device, turn off the electronic device, or turn off cellular capabilities associated with the electronic device.

4. The computer-readable medium of claim 1, wherein the representation of the charging status further comprises indications of at least the first battery charge level, the second battery charge level, and the battery charging time.

5. The computer-readable medium of claim 1, wherein determining the first charging rate associated with the battery charger further comprises determining a charging current associated with the battery charger.

6. A computer-implemented method comprising:
   determining, by one or more processors of an electronic device, a capacity associated with a battery of the electronic device;
   determining, by the one or more processors, a first battery charge level based at least in part on the capacity associated with the battery and at least an estimate of a present amount of charge associated with the battery;
   determining, by the one or more processors, a first charging rate associated with a first battery charger connected to the electronic device;
   determining, by the one or more processors and based at least in part on the battery capacity, the first charging rate, and the first battery charge level, a battery charging time, wherein the battery charging time is an estimation of a duration of time to charge the battery from the first battery charge level to a second battery charge level, wherein the second battery charge level is at a level between the first battery charge level and the capacity associated with the battery, and wherein the second battery charge level is determined using input received from a user of the electronic device;
   generating, by the one or more processors, a representation of a battery charging status indicative of at least the battery charging time, the first battery charge level, and the second battery charge level;
   identifying, by the one or more processors, a second battery charger based at least in part on the battery charging time, wherein a second charging rate associated with the second battery charger is faster than the first charging rate associated with the first battery charger; and
   generating, by the one or more processors, a notification, wherein the notification comprises a recommendation associated with the second battery charger.

7. The computer-implemented method of claim 6, wherein the notification includes a hyperlink associated with a purchase option for the second battery charger.

8. The computer-implemented method of claim 7, wherein the notification is one of:
   i) a text message,
   ii) an email message,
   iii) a pop-up message, or
   iv) a log screen advertisement.

9. The computer-implemented method of claim 7, wherein the battery charging time is a first battery charging time, the method further comprising:

determining, by the one or more computer processors and based at least in part on the battery capacity, the second charging rate, and the first battery charge level, a second battery charging time associated with the second battery charger, wherein the second battery charging time is an estimation of a duration of time to charge the battery from the first battery charge level to the second battery charge level, wherein the second battery charging time is less than the first battery charging time, and wherein the notification further comprises an indication of the second battery charging time.

10. The computer-implemented method of claim 6, further comprising causing, by the one or more processors, the representation of the battery charging status to be displayed.

11. An electronic device, comprising:
at least one memory storing computer-executable instructions; and
at least one processor, wherein the at least one processor is configured to access the at least one memory and to execute the computer-executable instructions to:
determine a capacity associated with a battery of the electronic device and a first battery charge level;
determine a first charging rate associated with a first battery charger connected to the electronic device;
determine a battery charging time based at least in part on the capacity associated with the battery, the first battery charge level, and the first charging rate, wherein the battery charging time is an estimation of a duration of time to charge the electronic device to a second battery charge level, wherein the second battery charge level is at a level between the first battery charge level and the capacity associated with the battery, wherein the second battery charge level is determined using input received from a user of the electronic device;
generate a representation of a charging status of the battery, wherein the representation is indicative of at least the battery charging time;
generate a recommendation for a second battery charger based at least in part on the battery charging time, wherein the second battery charger is associated with a second charging rate that is faster than the first charging rate; and
present the recommendation to a user of the electronic device.

12. The electronic device of claim 11, wherein the representation of the charging status of the battery further comprises the first battery charge level, and the second battery charge level.

13. The electronic device of claim 11, wherein the at least one processor is further configured to cause the representation of the charging status of the battery to be presented via the electronic device, wherein the representation of the charging status of the battery is presented in at least one of:
i) a text message,
ii) a pop-up message,
iii) an email message or
iv) a notification page.

14. The electronic device of claim 11, wherein the at least one processor is further configured to execute the computer-executable instructions to:

retrieve information associated with one or more applications associated with the electronic device, wherein the information comprises power consumption data associated with the one or more applications; and
present the retrieved information in association with the representation of the charging status.

15. The electronic device of claim 11, wherein the representation of the charging status of the battery is presented to a user in response to receiving an input from the user.

16. The electronic device of claim 11, wherein the at least one processor is further configured to execute the computer-executable instructions to present a charging display in response to detecting the first battery charger connected to the electronic device.

17. The electronic device of claim 11, wherein the at least one processor is further configured to execute the computer-executable instructions to:
generate a notification in response to the electronic device reaching the second battery charge level, wherein the notification is one of:
i) a text message,
ii) an email message,
iii) a pop-up message,
iv) an audible alarm, or
v) a vibration alarm.

18. The electronic device of claim 11, wherein the battery charging time is a first battery charging time and wherein the at least one processor is further configured to execute the computer-executable instructions to:
determine, based at least in part on the battery capacity, the second charging rate, and the first battery charge level, a second battery charging time associated with the second battery charger, wherein the second battery charging time is an estimation of a duration of time to charge the battery from the first battery charge level to the second battery charge level, and wherein the second battery charging time is less than the first battery charging time, and
wherein the at least one processor is configured to:
generate the recommendation for the second battery charger further based at least in part on the second battery charging time being less than the first battery charging time; and
present the recommendation by generating and transmitting a notification comprising the recommendation and a hyperlink associated with a purchase option for the second battery charger.

19. The non-transitory computer-readable medium of claim 1, the operations further comprising:
determining a location of the electronic device;
determining that the location of the electronic device is in a country different than an associated country of residence for the electronic device; and
generating a recommendation for a third battery charger based at least in part on compatibility with power sources in the country different than the associated country of residence.

* * * * *